(12) United States Patent
Nguyen et al.

(10) Patent No.: US 10,371,903 B1
(45) Date of Patent: Aug. 6, 2019

(54) SPACERS FOR USE IN A FIBER OPTIC CONNECTOR

(71) Applicant: US Conec, Ltd, Hickory, NC (US)

(72) Inventors: Hiep V. Nguyen, Fort Mill, SC (US); Darrell R. Childers, Hickory, NC (US); Myron W. Yount, Conover, NC (US); Jillcha F. Wakjira, Hickory, NC (US); Jason Higley, Hickory, NC (US); Brent D. Henley, Maiden, NC (US)

(73) Assignee: US Conec Ltd, Hickory, NC (US)

( * ) Notice: Subject to any disclaimer, the term of this patent is extended or adjusted under 35 U.S.C. 154(b) by 0 days.

(21) Appl. No.: 15/997,593

(22) Filed: Jun. 4, 2018

(51) Int. Cl.
*G02B 6/38* (2006.01)
*G02B 6/40* (2006.01)

(52) U.S. Cl.
CPC .......... *G02B 6/403* (2013.01); *G02B 6/3821* (2013.01); *G02B 6/3873* (2013.01); *G02B 6/3882* (2013.01); *G02B 6/3833* (2013.01)

(58) Field of Classification Search
None
See application file for complete search history.

(56) References Cited

U.S. PATENT DOCUMENTS

2006/0239619 A1 10/2006 Luther et al.
2012/0281951 A1* 11/2012 Takahashi ............ G02B 6/3846
385/80

FOREIGN PATENT DOCUMENTS

JP 4857192 B2 1/2012

* cited by examiner

*Primary Examiner* — Jerry Rahll
(74) *Attorney, Agent, or Firm* — Michael L. Leetzow, P.A.; Shubhrangshu Sengupta

(57) ABSTRACT

A spacer to be used with a fiber optic connector includes a two portions with spring retaining members and a cross member extending between the first and second portions. The cross member has an extension extending from the cross member between the first portion and the second portion and away from a front face thereof. The spacer may also have retention pins to engage a fiber optic ferrule.

19 Claims, 12 Drawing Sheets

SPACERS FOR USE IN A FIBER OPTIC CONNECTOR

BACKGROUND OF THE INVENTION

There are a number of fiber-optic connectors that use a lensed ferrule, such as the MXC® connector using the Prizm® MT ferrule. In using these fiber optic connectors, the lenses is mated fiber optic ferrules need to be aligned so that light exiting the lenses in the fiber optic ferrule in received in the lenses in the corresponding ferrule. Accordingly, alignment between the lenses in the mated ferrule is critical for having a low-insertion loss. To keep the ferrules in these connectors engaged with a corresponding ferrule and in alignment, a spring is used to bias the ferrule in at least one of the fiber optic connectors. To keep the spring in alignment with respect to the fiber optic ferrule, a spring seat is included in the fiber optic connector. For a Prizm MT ferrule, it is formed as part of the back of the ferrule.

However, the spring may not always be seated properly in the spring seat (e.g., it could partially dislodge from the seat). When the spring is not seated properly, optical connection properties (e.g., insertion loss) may suffer. For example, when the fiber optic connector is bent due to an external force and the spring is not seated properly due to incorrect assembly of the connector, the optical alignment of the lenses in the mated ferrules may be compromised, thereby leading to an increased insertion loss.

Additionally, improper assembly of the connector by an operator may also contribute to increased insertion losses. An operator may not assemble the connector with the correct polarity of the lensed ferrule inside the connector. Accordingly, two sides of the connector (short and long sides) may not be configured correctly, leading to damage to the connector due to the stubbing of the mating guide pins.

In order to prevent such issues and to better ensure alignment, a new spacer that is disposed behind the fiber optic ferrule and in front of the spring has been designed.

SUMMARY OF THE INVENTION

The present invention is directed to a spacer to be used with a fiber optic connector that includes a first portion having a first retention pin extending from a front face and away from the first portion and a first spring retaining member extending from a back face and extending away from the first portion, a second portion having a second retention pin extending from a front face and away from the first portion and a second spring retaining member extending from a back face and extending away from the first portion, each of the first and second retention pins configured to engage a respective opening in a fiber optic ferrule in the fiber optic connector and a cross member extending between the first and second portions, the cross member joining the first and second portions and having a front face, the cross member having an extension extending from the cross member between the first portion and the second portion and away from a front face thereof.

In some embodiments, a male spacer key extends from the first portion in a direction orthogonal to an axis through the first retention pin and the first spring retaining member.

In some other embodiments, a recessed portion on the cross member adjacent the front face thereof.

In another embodiment, the cross member has a first bottom surface lying in a first plane and the extension has a second bottom surface lying in a second plane, the first and second planes being offset from one another.

According to another aspect of the present invention, there is a spacer to be used with a fiber optic connector that includes a first portion having first spring retaining member extending from a back face and extending away from the first portion, a second portion having a second spring retaining member extending from a back face and extending away from the second portion, and a cross member extending between the first and second portions, the cross member joining the first and second portions and having a front face, the cross member having an extension extending from the cross member between the first portion and the second portion and away from the front face According to yet another aspect of the present invention, there is a combination of a spacer and a fiber optic ferrule that includes a fiber optic ferrule further including a main body having a front face, a rear face, a first opening extending from the rear face toward the front face to receive optical fibers therein, at least two openings extending from the rear face into the main body towards the front face, and the spacer further including a first portion having a first retention pin extending from a front face and disposed within one of the at least two openings in the fiber optic ferrule and a first spring retaining member extending from a back face and extending away from the first portion, a second portion having a second retention pin extending from a front face and disposed within another of the at least two openings in the fiber optic ferrule and a second spring retaining member extending from a back face and extending away from the first portion, and a cross member extending between the first and second portions, the cross member joining the first and second portions and having a front face, the cross member having an extension extending from the cross member between the first portion and the second portion and away from the front face.

And according to yet another aspect of the invention, there is a spacer to be used with a fiber optic connector that includes a first portion having a first retention pin extending from a front face and away from the first portion and a first spring retaining member extending from a back face and extending away from the first portion, a second portion having a second retention pin extending from a front face and away from the first portion and a second spring retaining member extending from a back face and extending away from the first portion, each of the first and second retention pins configured to engage a respective opening in a fiber optic ferrule in the fiber optic connector, a cross member extending between the first and second portions, the cross member joining the first and second portions and having a front face, the cross member having an extension extending from the cross member between the first portion and the second portion and away from the front face, and a male spacer key extending from the first portion in a direction orthogonal to an axis through the first retention pin and the first spring retaining member.

It is to be understood that both the foregoing general description and the following detailed description of the present embodiments of the invention are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and, together with the description, serve to explain the principles and operations of the invention.

DETAILED DESCRIPTION OF THE INVENTION

Figure 1:
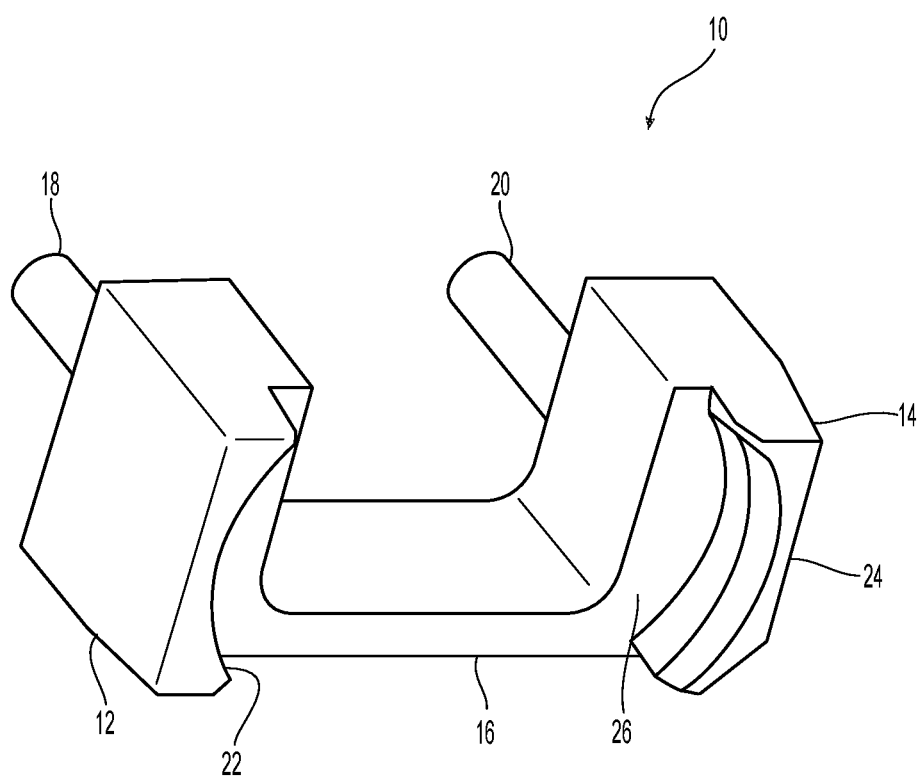
FIG. 1 is a perspective view of a prior art spacer.

Reference will now be made in detail to the present preferred embodiment(s) of the invention, examples of which are illustrated in the accompanying drawings. Whenever possible, the same reference numerals will be used throughout the drawings to refer to the same or like parts.

FIG. 1 illustrates a prior art spacer 10. The spacer 10 has two portions 12,14 connected by a cross member 16. The spacer 10 has a two pins 18, 20 extending from a front face of the spacer 10. The pins 18, 20 are to engage corresponding openings in a fiber optic ferrule, not shown. The spacer 10 also has two spring retaining members 22,24 extending from a back face 26 of the spacer 10. A spring (not shown) engages the back face 26 of the spacer 10 and the two spring retaining members 22,24 center the spring on the spacer 10. However, the spring retaining members 22,24 do not always retain the spring between the two members. Additionally, the spring may snag or catch on the spring retaining members 22,24, causing the spacer 10 to be unevenly biased against the fiber optic ferrule to which the spacer is attached.

Figure 2:
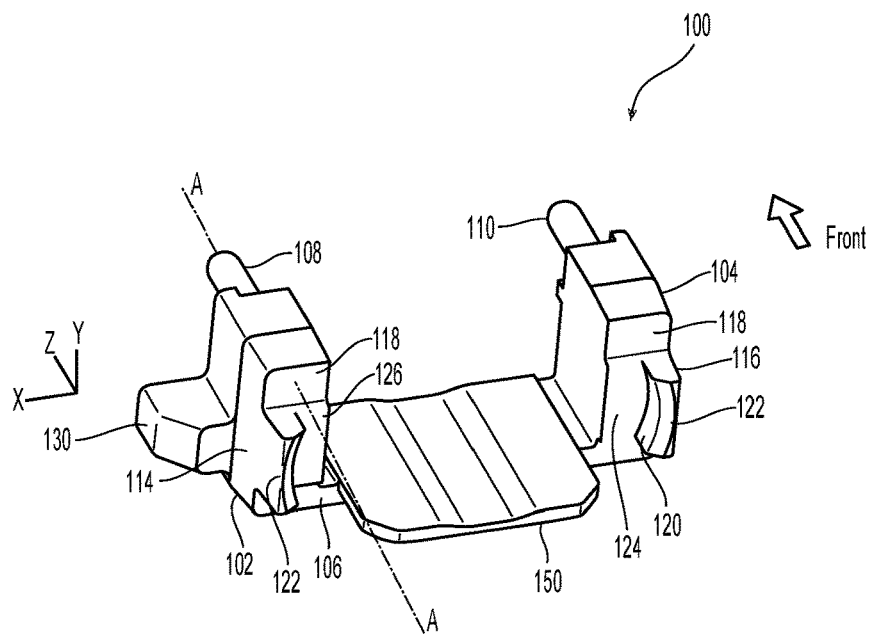
FIG. 2 is a back perspective view of one embodiment of a spacer according to the present invention.
Figure 3:
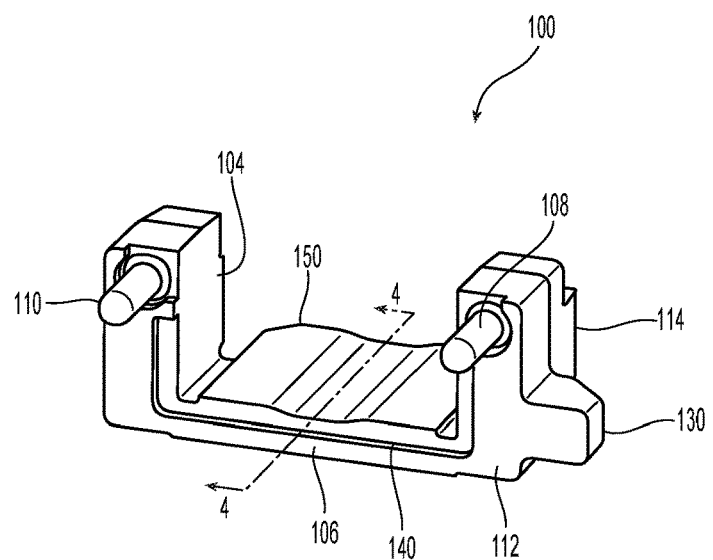
FIG. 3 is a front perspective view of the spacer of FIG. 2.

A first embodiment of a spacer 100 according to the present invention is clearly illustrated in FIGS. 2 and 3. The spacer 100 has a first portion 102 and a second portion 104 connected by a cross member 106. The spacer 100 may also have two retention pins 108,110 extending from a front face 112 of the spacer 100. Preferably each of the first portion 102 and a second portion 104 and the cross member 106 all have one contiguous front face 112. However, there may be variation in the front face and it would still fall within the scope of the present invention. The retention pins 108, 110 are used to engage corresponding openings in a fiber optic ferrule 300, such as the one illustrated in FIGS. 6-8. While the retention pins are illustrated as being cylindrical, they could have other configurations and still fall within the scope of the present invention. For example, the retention pins may be square, rectangular, hexagonal, etc. and still perform the same function. Naturally, the corresponding openings to receive those retention pins would preferably be similarly configured. The combination of the retention pins 108, 110 engaging the openings in the fiber optic ferrule 300 keep these two components aligned with one another in the fiber optic connector. Alternatively, the spacer 100 may have openings into the first and second portions 102,104 and the fiber optic ferrule 300 may have the pins, or there may be one retention pin and one opening in each of the fiber optic ferrule 300 and the spacer 100.

The term "front" and "forward" as used herein means that direction where the fiber optic connector would mate with another fiber optic connector or device, while the term "rear" or "back" is used to mean the direction from which the optical fibers enter into the fiber optic ferrule. So turning to FIGS. 2 and 6, the front is the direction shown by the arrow and "back" or "rearward" is the opposite direction. Thus, the front of the fiber optic ferrule 300 is pointed to the right in FIG. 6.

Figure 7:
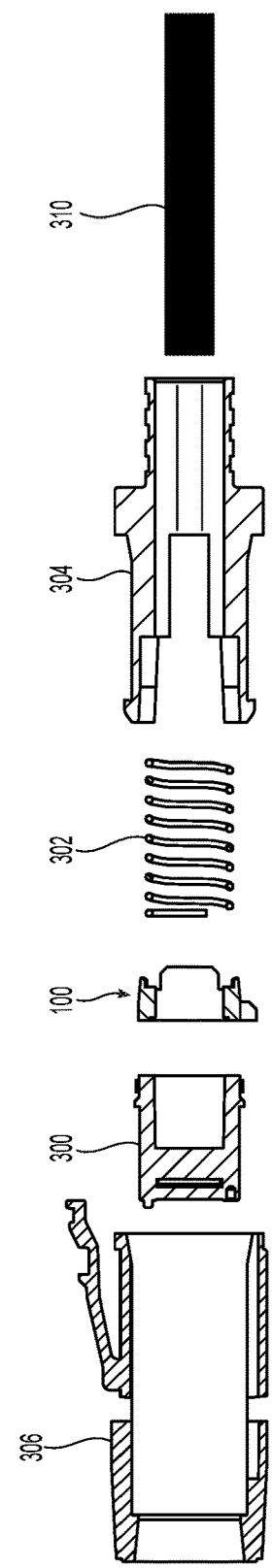
FIG. 7 is an exploded view of the fiber optic connector of FIG. 5.

The spacer 100 also has two spring retaining members 114,116 extending from a back face 118 of the spacer 100. A spring 302 is disposed next to the back face 118 of the spacer 100, and the two spring retaining members 114,116 center the spring 302 on the spacer 100. As shown in FIG. 7, the spring 302 is biased against the spacer 100 by a spring push 304. Each of the spring retaining members 114, 116 have a first part that is adjacent the back face 118 of the spacer 100. An inside surface 120 of each of the spring retaining members 114, 116 is configured in a circular or oval configuration to match the configuration of the spring 302. Rearward of the inside surface 120 is a chamfered portion 122 to assist in aligning the spring 302 with the spacer 100. The chamfered portion 122 also assists in keeping the spring 302 from stubbing or being disposed outside of the spacer 100. However, the chamfered portion 122 may be omitted from the spring retention members 114,116 and just have the inside surface 120. In this case, the spring retaining members 114,116 would be shorter (i.e., not extend as far behind the spacer 100) as when the chamfered portion 122 is present.

Additionally, there may also be spring pads 124 disposed on the back face 118 of each of the first portion 102 and second portion 104. Each of the pair of spring pads 124 has an engagement surface 126 facing away from the spacer 100 or in a rearward direction as noted above. The engagement surfaces 126 of the pair of spring pads 124 lie in a single plane PP. The advantages of the spring pads is discussed at length in U.S. Pat. No. 9,720,182, assigned to the same applicant, the contents of which are incorporated by reference.

This embodiment of spacer 100 also has a male spacer key 130 extending from the first portion 102 in a direction orthogonal to an axis through the first retention pin 108 and the first portion 102. The male spacer key 130 requires that the combination of the fiber optic ferrule 300 and the spacer 100 is installed into the connector housing 306 in only one polarity. Without the male spacer key 130, the combination of the fiber optic ferrule 300 and the spacer 100 could be installed in either of two orientations in the connector housing 306. With a corresponding slot 308 in the connector housing 306, the combination of the fiber optic ferrule 300 and the spacer 100 could only be inserted in one correct orientation with the spacer key 130 lined up with that corresponding slot 308.

The spacer 100 also has a recessed portion 140 on the cross member 106. The recessed portion 140 is essentially a groove in the front face 112 of the cross member 106. The recessed portion 140 may also continue around and up on a portion of the first portion 102 and/or the second portion 104. The recessed portion 140 acts as a space for any extra epoxy that may be left after the assembly of the connector.

Figure 4:
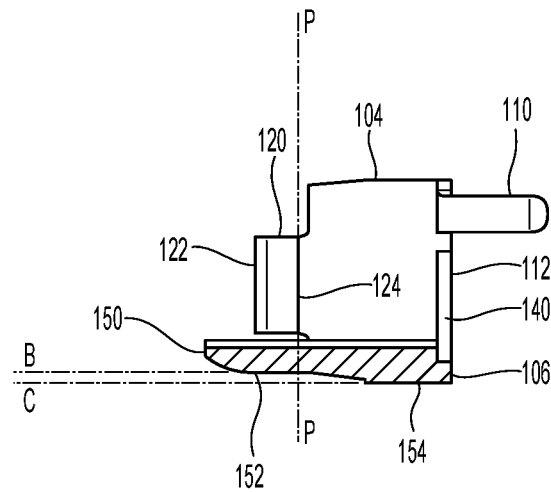
FIG. 4 is a cross sectional view of the spacer in FIG. 3 along the line 4-4.
Figure 5:
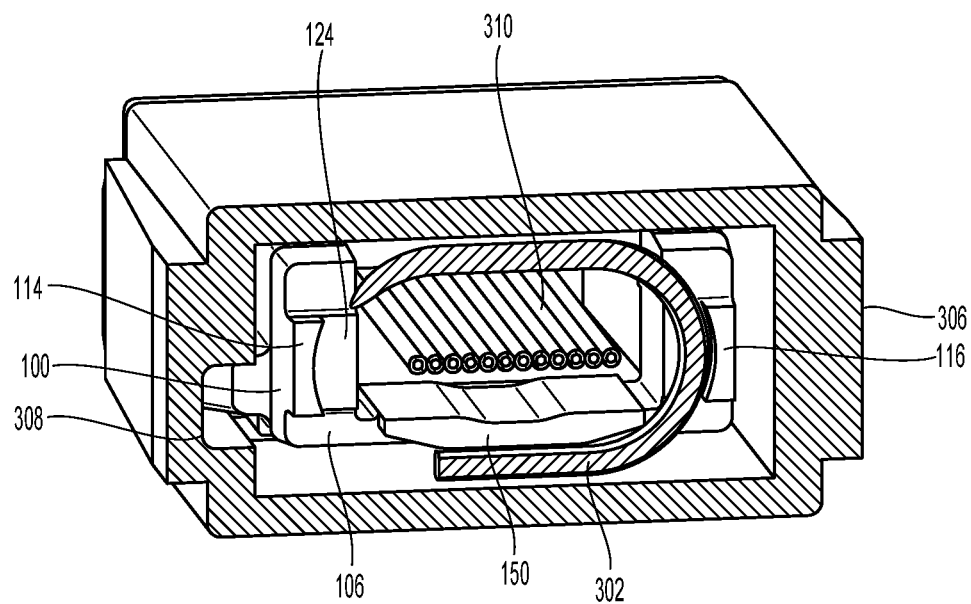
FIG. 5 is a cross sectional view from the back of a fiber optic connector with the spacer of FIG. 2 therein.

The spacer 100 includes an extension 150 that is a part of the cross member 106. The extension 150 is illustrated as being integral to the cross member 106, but could separate, added later, etc. The extension 150 extends from adjacent the front face 112 of the spacer 100 in a backward direction between the first portion 102 and the second portion 104 and behind the back face 118. Optical fibers 310 pass above the extension 150 and between the first portion 102 and the second portion 104. See FIG. 5. As best seen in FIG. 4, the extension 150 has a bottom surface 152 that lies in a plane B that is above the bottom surface 154 of the cross member 106, which lies in a plane C. The planes B and C are offset from one another and parallel to one another. Other relationships between the planes are also possible. The reason for the space between the bottom surface 152 of extension 150 and the bottom surface 154 of cross member 106 is that the spring 302 passes under the extension 150. See FIG. 5. The extension 150 also assists in centering the spring 302 relative to the spacer 100. Since the extension 150 extends rearwardly beyond the spring retaining members 114,116, the extension 150 provides the first guidance for the spring 302 as it engages the spacer 100. As the spring 302 continues forward toward the front face 112 of the spacer 100, the extension 150 guides the spring 302 into the spring retaining members 114,116, with the assistance of the chamfered portion 122, if present. The extension 150 also assists to maintain the spring 302 within the spring retaining members 114,116. Depending on the distance between planes B and C, the spring 302 may also be partially retained and/or constrained by the inside surface of the connector housing 304 and the extension 150.

Figure 6:
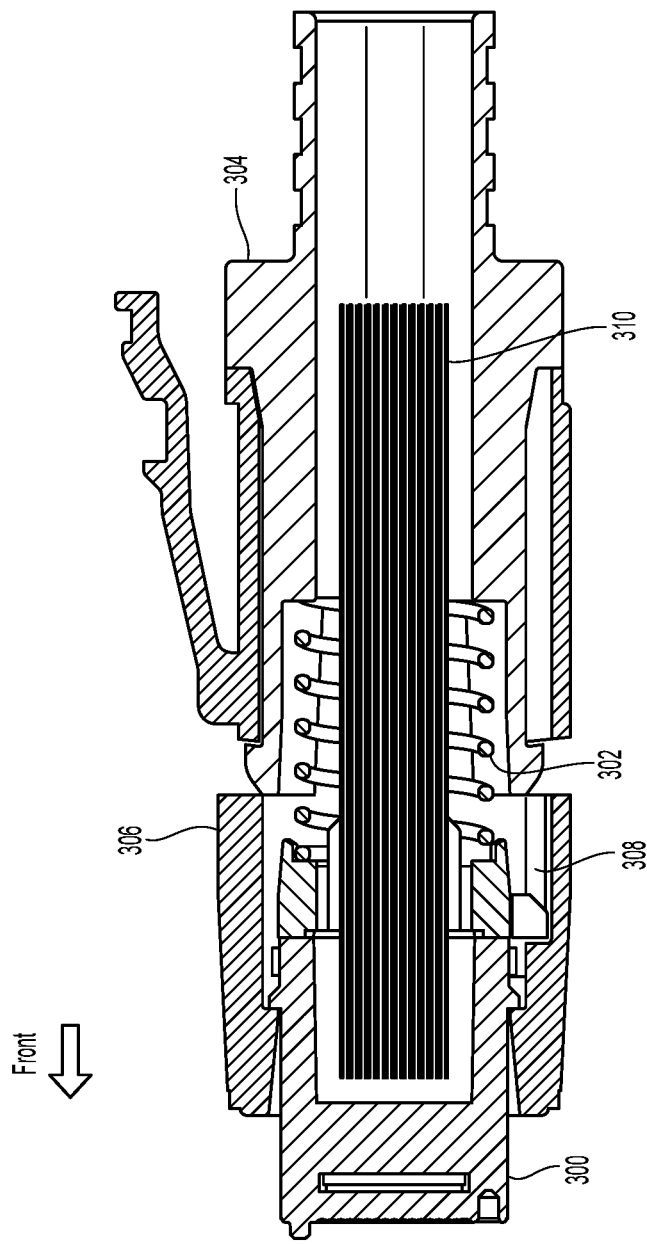
FIG. 6 is a cross sectional view from the top of the fiber optic connector of FIG. 5.
Figure 8:
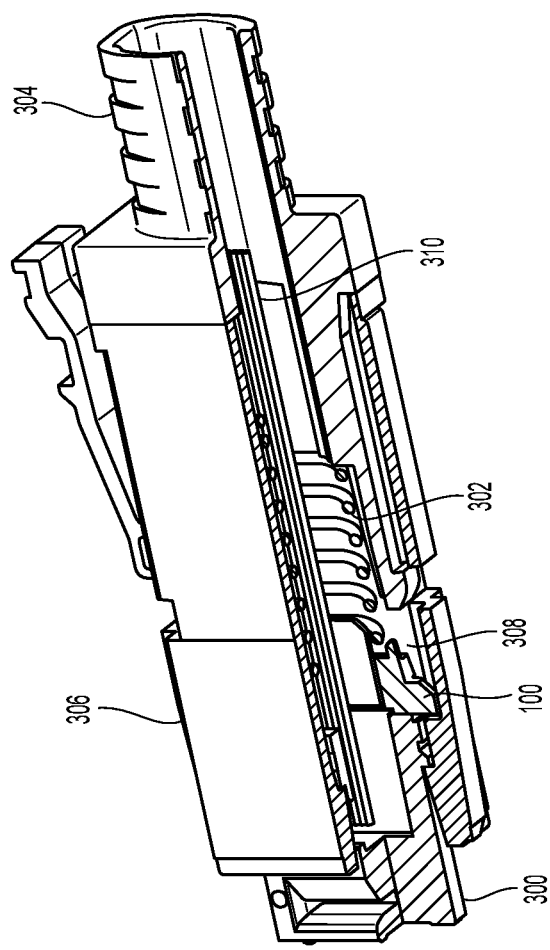
FIG. 8 is a perspective view of a partial cross section of the fiber optic connector of FIG. 5.
Figure 9:
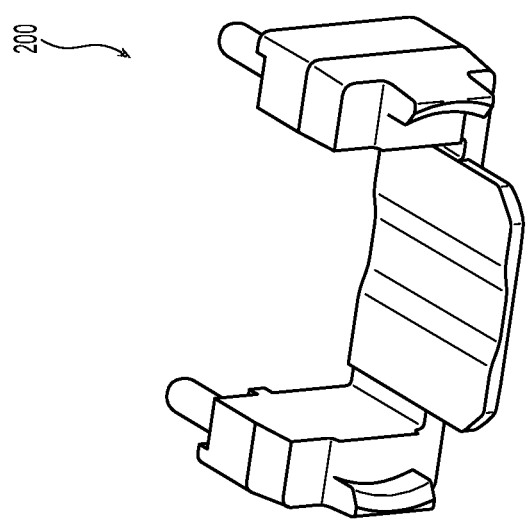
FIG. 9 is a back perspective view of a second embodiment of a spacer according to the present invention.
Figure 10:
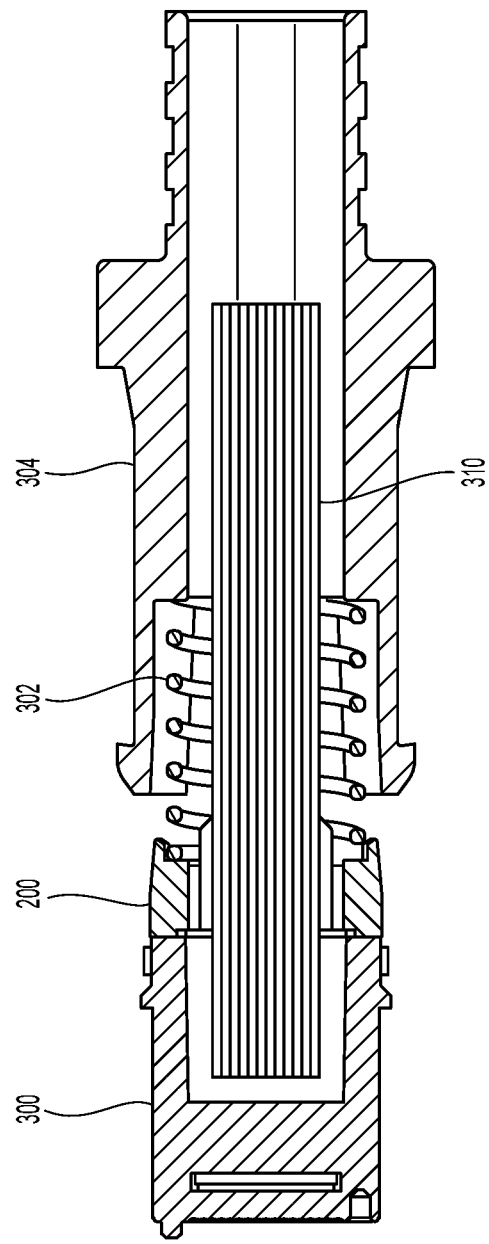
FIG. 10 is a top plane view of the spacer in FIG. 9 with a fiber optic ferrule, a spring and a spring push.
Figure 11:
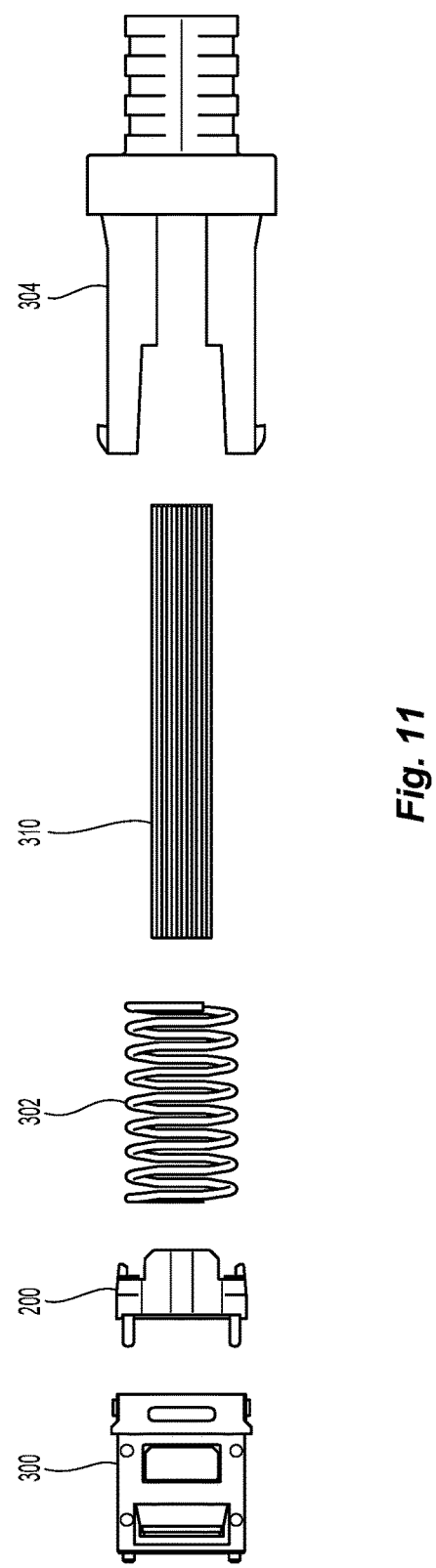
FIG. 11 is an exploded view of the combination of FIG. 8.
Figure 12:
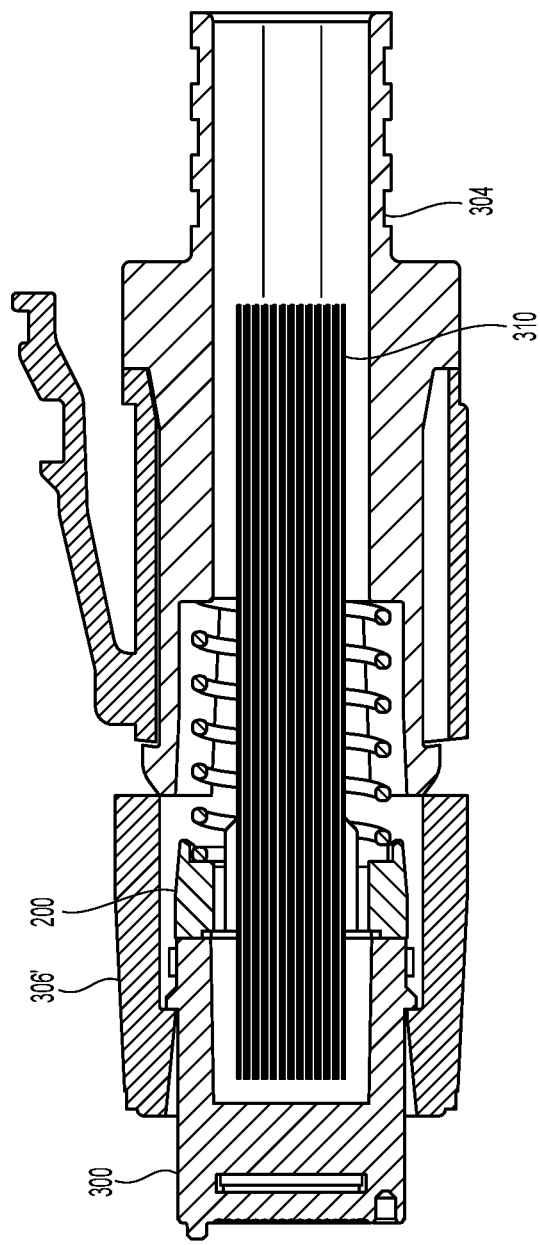
FIG. 12 is a cross sectional view from the top of a fiber optic connector with the spacer of FIG. 9 therein.

As illustrated in FIGS. 6-8, the mated fiber optic ferrule 300 and the spacer 100 can only fit into the connector housing 306 in one orientation. The male spacer key 130 has to be aligned with the slot 308 in order for the spacer 100 to enter the connector housing 306. Depending on whether the connector housing 306 belongs to a long connector (used to bring in the optical fibers from the outside of a rack that has the backplane) or to a short connector (which is on the same side as the circuit board(s) on the other side of the backplane), the male spacer key 130 will be on the left side of the spacer 100 or the right side of the spacer 100. For example, if the spacer 100 in FIG. 2, has the key 130 on the left side (for a short connector), then the spacer 100 for the long connector will have the key on the opposite (right) side. This opposite orientation of the spacer male key 130 for the long and the short connectors ensures that the incorrect spacer is not used during the assembly of the respective connectors, since an incorrect spacer male key will not match up with the female slot 308 of the housing 306 of the respective connectors.

However, as illustrated in FIGS. 9-12, there may instances where the polarity or orientation of the fiber optic ferrule 300 (and the optical fibers 310) is not an issue. In this case, another embodiment of a spacer 200 could be used and it would not have the male spacer key.

Figure 14:
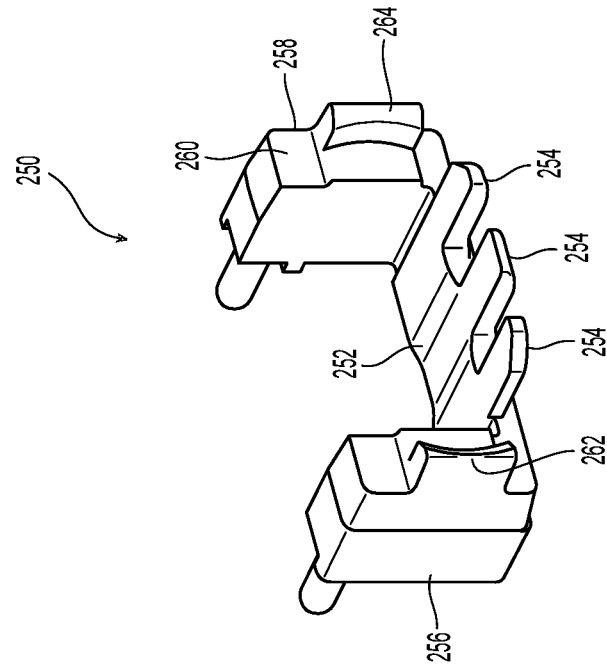
FIG. 14 a perspective view of a fourth embodiment of a spacer according to the present invention.
Figure 13:
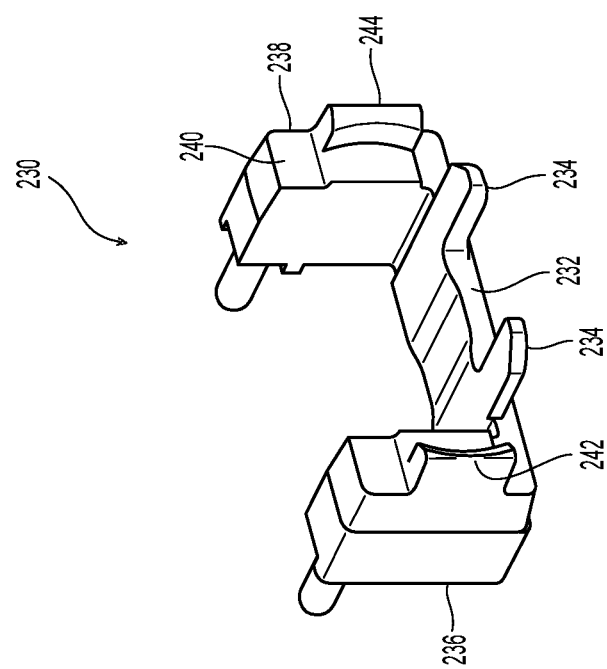
FIG. 13 is a perspective view of a third embodiment of a spacer according to the present invention.
Figure 15:
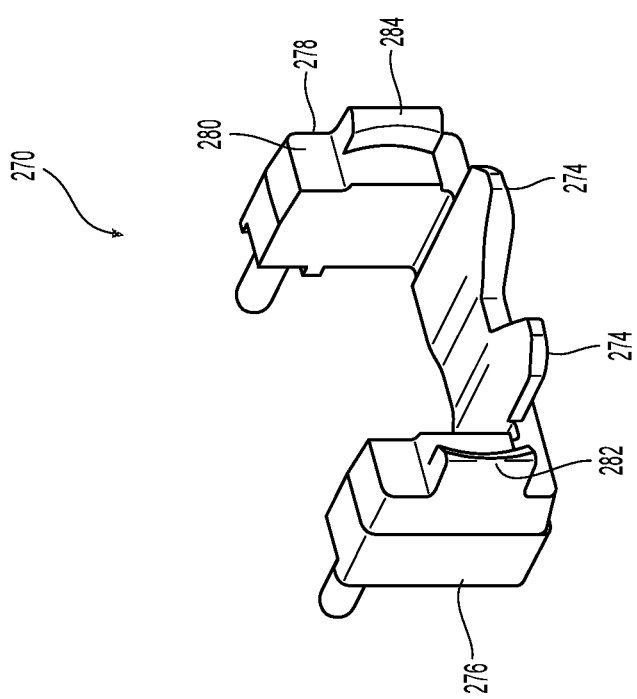
FIG. 15 is a back perspective view of a fifth embodiment of a spacer according to the present invention.

In FIGS. 13-15 are alternative embodiments of a spacer according to the present invention having different configurations of an extension of the cross member. As can be realized from studying the figures, the spacers have the basic structure of the spacers discussed above. However, in these embodiments, the male spacer key is not shown, but these spacers may also have the male spacer key. In FIG. 13, a spacer 230 has an extension 232 that has two side portions 234 that extend in a backward direction between the first portion 236 and the second portion 238 and behind the back face 240. The side portions 234 are the structures that would engage and guide the spring 302 in the correct position for the spring retaining members 242 and 244.

FIG. 14 illustrates a spacer 250 has an extension 252 that has three smaller extension portions 254 that extend in a backward direction between the first portion 256 and the second portion 258 and behind the back face 260. The three smaller extension portions 254 are the structures that would engage and guide the spring 302 in the correct position for the spring retaining members 262 and 264.

FIG. 15, a spacer 270 has an extension 272 that has two side portions 274 that extend in a backward direction between the first portion 276 and the second portion 278 and behind the back face 260. The side portions 254 are the structures that would engage and guide the spring 302 in the correct position for the spring retaining members 282 and 284.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

We claim:

1. A spacer to be used with a fiber optic connector comprising:
   a first portion having a first retention pin extending from a front face and away from the first portion and a first spring retaining member extending from a back face and extending away from the first portion;
   a second portion having a second retention pin extending from a front face and away from the second portion and a second spring retaining member extending from a back face and extending away from the second portion, each of the first and second retention pins configured to engage a respective opening in a fiber optic ferrule in the fiber optic connector;
   a cross member extending between the first and second portions, the cross member joining the first and second portions and having a front face, the cross member having an extension extending from the cross member between the first portion and the second portion and away from the front face and at least a portion of the extension extending beyond the back faces; and
   a male spacer key extending from the first portion in a direction orthogonal to an axis through the first retention pin and the first portion.

2. The spacer according to claim 1, wherein the extension is disposed inwardly of the first and second portions.

3. The spacer according to claim 1, wherein there is a first gap between the first portion and the extension and a second gap between the second portion and the extension.

4. The spacer according to claim 1, further comprising a recessed portion on the cross member adjacent the front face thereof.

5. The spacer according to claim 4, wherein the recessed portion on the cross member extends to a part of the first portion and the second portion.

6. The spacer according to claim 1, wherein the cross member has a first bottom surface lying in a first plane and the extension has a second bottom surface lying in a second plane, the first and second planes being off set from one another.

7. The spacer according to claim 1, wherein the cross member has a first bottom surface lying in a first plane and the extension has a second bottom surface lying in a second plane, the first and second planes being parallel to one another.

8. The spacer according to claim 1, further comprising a spring seat disposed on the back face of each the first and second portions, each of the spring seats extending rearward away from the first and second portions and lying in a single plane.

9. The spacer according to claim 1, wherein the first spring retaining member and the second spring retaining member have a chamfered portion facing away from the spacer.

10. A spacer to be used with a fiber optic connector comprising:
- a first portion having first spring retaining member extending from a back face and extending away from the first portion;
- a second portion having a second spring retaining member extending from a back face and extending away from the second portion; and
- a cross member extending between the first and second portions, the cross member joining the first and second portions and having a front face, the cross member having an extension extending from the cross member between the first portion and the second portion and away from the front face and at least a portion of the extension extending beyond the back faces, wherein the first portion, second portion and the extension form a u-shaped opening allowing access to the u-shaped opening from above the u-shaped opening.

11. The spacer according to claim 10, further comprising a male spacer key extending from the first portion in a direction orthogonal to an axis through the first portion and the first spring retaining member.

12. The spacer according to claim 10, further comprising a recessed portion on the cross member adjacent the front face thereof.

13. The spacer according to claim 12, wherein the recessed portion on the cross member extends to a part of the first portion and the second portion.

14. The spacer according to claim 10, wherein the cross member has a first bottom surface lying in a first plane and the extension has a second bottom surface lying in a second plane, the first and second planes being off set from one another.

15. The spacer according to claim 10, further comprising a spring seat disposed on the back face of each the first and second portions, each of the spring seats extending rearward away from the first and second portions and lying in a single plane.

16. The spacer according to claim 10, wherein the first spring retaining member and the second spring retaining member have a chamfered portion facing away from the spacer.

17. A combination of a spacer and a fiber optic ferrule comprising:
- a fiber optic ferrule further comprising:
  - a main body having a front face, a rear face, a first opening extending from the rear face toward the front face to receive optical fibers therein;
  - at least two openings extending from the rear face into the main body towards the front face; and
- a spacer further comprising:
  - a first portion having a first retention pin extending from a front face and disposed within one of the at least two openings in the fiber optic ferrule and a first spring retaining member extending from a back face and extending away from the first portion;
  - a second portion having a second retention pin extending from a front face and disposed within another of the at least two openings in the fiber optic ferrule and a second spring retaining member extending from a back face and extending away from the second portion; and
- a singular cross member extending between the first and second portions, the cross member joining the first and second portions and having a front face, the cross member having an extension extending from the cross member between the first portion and the second portion and away from the front face and at least a portion of the extension extending beyond the back faces.

18. The combination of a spacer and a fiber optic ferrule according to claim 17, further comprising a spring, the spring being a coil spring defining an elongated opening along a length thereof, the extension from the cross member being disposed within a portion of the elongated opening.

19. A spacer to be used with a fiber optic connector comprising:
- a first portion having a first retention pin extending from a front face and away from the first portion and a first spring retaining member extending from a back face and extending away from the first portion;
- a second portion having a second retention pin extending from a front face and away from the second portion and a second spring retaining member extending from a back face and extending away from the second portion, each of the first and second retention pins configured to engage a respective opening in a fiber optic ferrule in the fiber optic connector;
- a cross member extending between the first and second portions, the cross member joining the first and second portions and having a front face, the cross member having an extension extending from the cross member between the first portion and the second portion and away from the front face; and
- a male spacer key extending from the first portion in a direction orthogonal to an axis through the first retention pin and the first spring retaining member.

* * * * *